United States Patent Office 3,504,036
Patented Mar. 31, 1970

3,504,036
PROCESS FOR THE PRODUCTION OF
CYCLOALKANE-1,3-DIONES
Hans Schick, Gerhard Lehmann, and Gunter Hilgetag, Berlin, Germany, assignors to Deutsche Akademie der Wissenschaften zu Berlin, Berlin-Adlershof, Germany
No Drawing. Filed Jan. 19, 1967, Ser. No. 610,223
Int. Cl. C07c 49/28
U.S. Cl. 260—586                                       4 Claims

ABSTRACT OF THE DISCLOSURE

Process for the production of cycloalkane-1,3-diones useful as starting materials for the manufacture of steroids by the reaction of monocarboxylic acids or their active derivatives such as their halides or anhydrides with dicarboxylic acids or their active derivatives such as defined above in the presence of Friedel-Crafts catalysts, whereby in the case where the free acids are used as starting materials the mixture of the acids is activated by the addition of thionyl chloride or bromide prior to the addition of the catalyst.

---

The present invention relates to a process for the production of cycloalkane-1,3-diones, and more particularly to a process for the production of cyclopentane and cyclohexane-1,3-diones substituted in the 2-position.

M. Orchin and L. W. Butz in the J.A.C.S., 65, 2296 (1943) have disclosed a method whereby they obtained 2-methylcyclopentane-1,3-dione, the first member in the series of the 2-alkyl-cyclopentane-1,3-diones by the condensation of oxalic-acid-diethyl ester with methylethyl ketone followed by catalytic hydrogenation of the condensate.

An improved process for the production of 2-methyl-cyclopentane-1,3-diones starting from 2-methylcyclopentane-1,3,4-triones has been described by Ch. Sannié et al., Bull. Soc. Chim., France, 1955, 1936, and comprises the reduction of the semicarbazone of the aforementioned trione according to Wolff-Kischner.

The reduction of the trione utilizing the method of Clemmensen has been found also to result in the production of 2-methyl-cyclopentane-1,3-dione. Using a method similar in principle, H. Smith, J. Chem. Soc. (London), 1964, 4472, synthesized 2-alkyl-cyclopentane - 1,3-diones from semicarbazones of the corresponding 2-alkyl-cyclopentane-1,3,4-triones using the reduction method of Wolff-Kischner.

A still further method for the preparation of the 2-methyl-cyclopentane - 1,3-dione was published by R. Bucourt, et al., in Bull. Soc. Chim., France, 1965, 645. In this last method, 2-methyl-cyclopentane-1,3-dione was prepared by cyclicizing condensation of the propionyl-succinic-acid-diethyl-ester with sodium or potassium tert.-butylate.

Furthermore, it is known that 2-alkyl-cyclopentane and 2-alkyl-cyclohexane-1,3-diones can be prepared by the bis-acylation of enol-acetates of ketones or aldehydes with active succinic-acid or glutaric-acid derivatives under Friedel-Crafts conditions. 2-alkyl-cyclohexane-1,3-diones have been generally obtained by C-alkylation of the cyclohexane-1,3-dione. The previously proposed methods as described above are associated with numerous disadvantages including the following:

The synthesis of 2-methyl-cyclopentane-1,3-dione as described by Ch. Sannié and J. J. Panouse is a multi-step-process. The condensation of oxalic-acid diethyl-ester with methyl-ethyl-ketone under formation of the 4-methyl-2,3,5 - triketo-cyclo-pentyl-glyoxylic-acid-ethyl-ester requires sodium-alcoholate as condensation agent. The reduction of the 3-methyl-cyclopentane - 1,2,4-triones obtained by saponification of the glyoxylic-acid-ester with hydrochloric acid according to Wolff-Kischner necessitates the use of semicarbazide or hydrazine. Further, the yield of 2-methyl-cyclopentane-1,3-dione based on oxalic-acid-diethyl-ester amounts only to about 35%.

The process of H. Smith for the synthesis of 2-alkyl-cyclopentane-1,3-diones avoids the isolation of the intermediates, but uses however sodium-alcoholate as condensation agent and semicarbazide for the Wolff-Kischner reduction. The yields amount to only about 30 to 40%.

The cyclization of the propionyl-succinic-acid-diethyl ester to form the 2-methyl-cyclopentane-1,3-dione (R. Bucourt, et al.) results in yields of about 70%; however, the propionyl-succinic-diethyl-ester used as starting material for this known process is not readily available.

The synthesis of 2-alkyl-cyclopentane - 1,3 - diones, wherein enol-acetates of ketones or aldehydes are used as starting materials requires a ketene unit, which represents a serious drawback to this route.

It is an object of the present invention to provide a process for the manufacture of cycloalkane - 1,3-diones avoiding the disadvantages as set out above.

It is another object of the present invention to provide an economically feasible process for the manufacture of cycloalkane-1,3-diones which are valuable starting materials in the production of therapeutically useful steroids.

Further objects will become apparent as the description proceeds.

In accordance with the invention, it has now been found that cycloalkane-1,3-diones, i.e., cyclohexane-1,3-diones, cyclopentane-1,3-diones and derivatives thereof substituted in the 2-position can be prepared by treating an aliphatic monocarboxylic acid or an acid-halide or anhydride thereof with a member selected from the group consisting of succinic-acid and glutaric-acid and the acid-halide and anhydrides thereof in dissolved form with a Friedel-Crafts catalyst wherein if reaction components are in the form of the free acids, the mixture of the acids is activated prior to the addition of the catalyst by thionyl-chloride or bromide.

The reaction of the present invention may be carried out so that a free aliphatic monocarboxylic acid and the active form of one of the dicarboxylic acids, such as the anhydride or the acid-chloride, are treated in a suitable inert organic solvent; for example, nitro-methane, 1,2-dichloro-ethane, nitro-benzene and the like with a Friedel-Crafts catalyst, such as aluminum-chloride, etc. Similarly, it is possible to react a free dicarboxylic acid with the active form of an aliphatic monocarboxylic acid such as the anhydride or the acid halide. As halides, the chloride and the bromide may be used.

In an alternate procedure according to the present invention, it is furthermore possible to prepare the active acid form in the mixture of the dissolved free mono- and di-carboxylic acids by the addition of thionyl-chloride or bromide and thereafter treating the thusly obtained reaction mixture with a Friedel-Crafts catalyst, whereby the desired cyclohexane or cyclopentane-1,3-diones are produced.

Finally, also, the active forms of both acids can be reacted.

Generally, the reaction is carried out at a temperature of between 0° C. up to the boiling point of the solvent. Preferred temperatures for the reaction lie between 20 and 100° C. Usually the reaction is conducted in an inert atmosphere, such as nitrogen, argon, and the like. The aliphatic mono-carboxylic acids are selected in accordance with the desired C-2 substitution of the end products. For cycloalkane-1,3-diones substituted in the C-2 position, monocarboxylic acids having at least 3 carbon atoms are necessary, such as propionic acid, butyric acid, caproic acid, caprylic acid, and the like.

As the mono- and dicarboxylic acids and their derivatives which are required for the process of the invention are readily available, the present invention provides a highly economic synthesis for the manufacture of cycloalkane-1,3-diones, particularly of 1,3-diones substituted in the C-2 position. The latter compounds constitute especially valuable starting materials for the total-synthesis of steroids, e.g., C. H. Kuo et al., Angew. Chem., 77, 1142 (1965).

The following are given by way of example and are not to be construed as in any wise limiting the scope of the invention.

EXAMPLE 1

2-methyl-cyclopentane-1,3-dione 14.8 g. (0.2 mol) of propionic acid and 15.5 g. (0.1 mol) succinic-acid-dichloride were added to a solution containing 32.0 g. (0.24 mol) of sublimed aluminum chloride in 30 ml. anhydrous nitro-methane in a nitrogen atmosphere within a time period of 1 min. The reaction mixture was kept for 3 hours at a temperature of 80° C., and thereafter cooled to 10° C. and poured onto ice, with external cooling additionally being applied. The precipitated brownish-colored 2-methyl-cyclopentane-1,3-dione was recovered by suction, filtered, washed with 10 ml. cold water and recrystallized from water under the addition of active carbon.

The filtrate remaining following suction recovery of raw product was boiled following evaporation of the nitromethane and the addition of active carbon. Thereafter the so-treated filtrate was again filtered and extracted with ether. After evaporating the ether down to an amount of 100 ml., the 2-methyl-cyclopentane-1,3-dione crystallized out.

The total amount of the 2-methyl-cyclo-pentane-1,3-dione recovered was 5.03 g. (45% of the theoretical amount).

The melting point of the dione was 214–216° C. If anhydrous 1,2-dichloro-ethane was used in place of nitromethane, a yield of 3.85 g. (34% of the theoretical amount) was obtained.

EXAMPLE 2

2-ethyl-cyclopentane-1,3-dione 17.6 g. (0.2 mol) of butyric acid and 15.5 (0.1 mol) of succinic-acid-dichloride were introduced into a solution of 32.0 g. (0.24 mol) of sublimed aluminum-chloride in 30 ml. anhydrous nitro-methane under a nitrogen atm. was added. The reaction mixture was heated for 3½ hours at a temperature of 80° C., then cooled to 10 C., and poured into 60 g. of ice. The precipitated brown colored 2-ethylcyclopentane-1,3-dione was recrystallized from water under the addition of active carbon. Yield 3.64 g. (29% of the theoretical value). Melting point: 176–177° C.

EXAMPLE 3

2-methyl-cyclohexane-1,3-dione 14.8 g. (0.2 mol) of propionic acid and 16.9 g. (0.1 mol) of glutaric-acid-dichloride were added under a nitrogen atmosphere, dropwise, within 1 min. to a solution of sublimed aluminum-chloride in 30 ml. anhydrous nitromethane. The reaction mixture was then kept for 3 hours at a temperature of 80° C., and thereafter cooled to 10° C. and poured onto ice, external cooling being additionally applied. The precipitated 2-methyl-cyclohexane-1,3-dione was separated off with suction and recrystallized from water with the addition of active carbon. Yield: 5.0 g. (40% of the theoretical value). Melting point: 204–206° C.

EXAMPLE 4

2-methyl-cyclopentane-1,3-dione

To a cooled suspension of 11.8 g. (0.1 mol) of succinicacid in 27.8 g. (0.3 mol) of propionic-acid-chloride and 30 ml. of anhydrous nitro-methane, there were added with stirring and under a nitrogen atmosphere 32.0 g. (0.24 mol) of sublimed aluminum chloride. After the termination of the first violent reaction, the reaction mixture was kept for 3 hours at a temperature of 80° C.; afterward cooled to 10° C. and poured onto 60 g. ice whereby external cooling was applied. The working-up of the reaction mixture took place as described in Example 1. Total yield: 7.6 g. (68% of the theoretical value). Melting point 214–216° C. If 1,2-dichloro-ethane was used instead of nitro-methane, a total yield of 3.6 g. (32% of the theoretical value) was obtained.

EXAMPLE 5

2-methyl-cyclopentane-1,3-dione

To a solution of 32.0 g. (0.24 mol) of sublimed aluminum-chloride in 30 ml. anhydrous nitro-methane there were added within 1 min. 18.5 g. (0.2 mol) propionic-acidchloride and 15.5 g. (0.1 mol) of succinic-acid dichloride under a nitrogen atmosphere. The reaction mixture was kept for 3 hours at a temperature of 80° C. and afterwards cooled to 10° C. and poured onto 60 g. ice. The working-up proceeded as described in Example 1. Total yield: 1.25 g. (11% of the theoretical value). Melting point: 214–216° C.

EXAMPLE 6

2-methyl-cyclohexane-1,3-dione 32.0 g. (0.24 mol) of sublimed aluminum chloride were introduced into a solution of 10.0 g. (0.1 mol) of succinic-acid-anhydride 18.5 g. (0.2 mol) propionic-acidchloride in 30 ml. nitromethane under a nitrogen atmosphere. The reaction mixture was kept for 3 hours at a temperature of 80° C. and afterwards cooled to 10° C. and then poured onto 60 g. of ice. The working-up of the reaction mixture proceeded according to Example 1. Total yield: 0.83 g. (7% of the theoretical value); melting point: 214–216° C.

EXAMPLE 7

2-methyl-cyclopentane-1,3-dione

A mixture of 11.8 g. (0.1 mol) of succinic-acid, 14.8 g. (0.2 mol) of propionic acid, 23.8 g. (0.2 mol) of thionyl-chloride and 30 ml. nitromethane was refluxed for 3 hours, cooled to 20° C. and after the addition of 32.0 g. (0.24 mol) of sublimed aluminum-chloride kept for 3 hours at 80° C. After cooling, the mixture was poured onto 60 g. of ice with external cooling being additionally applied. The working-up proceeded according to Example 1. Total yield: 3.1 g. (28% of the theoretical value). Melting point: 214–216° C.

EXAMPLE 8

2-methyl-cyclopentane-1,3-dione

To a suspension of 320 g. (2.4 mols) of sublimed aluminum chloride in 300 ml. anhydrous nitrobenzene there were added under cooling an anhydrous conditions 231 g. (2.5 mols) of propionic-acid-chloride and 118 g. (1 mol) of succinic acid. The reaction mixture was kept for 3 hours at 80° C., then cooled to 10° C. and poured onto 600 g. of ice. After cooling to about 0° C., the precipitated crude 2-methyl-cyclopentane-1,3-dione was sucked off, washed with a small amount of water and recrystallized in water with the addition of active carbon. The filtrate of the crude product was separated into an aqueous and organic phase. The aqueous phase was heated to the boiling point after the addition of active carbon, filtered and then continuously extracted with ether. After concentrating the ether extracts a second fraction of 2-methyl-cyclopentane-1,3-dione was obtained. Total yield: 67 g. (60% of the theoretical value). Melting point: 214–216° C.

What is claimed is as follows:

1. Process for the production of cycloalkane-1,3-diones which comprises reacting a propionic, butyric, caproic or caprylic acid chloride or bromide with succinic or glutaric acid in the presence of a Friedel-Crafts catalyst and an inert solvent and at a temperature from 20 to 100° C.

2. Process according to claim 1, wherein said solvent is a member selected from the group consisting of nitromethane, 1,2-dichloro-ethane and nitro-benzene.

3. Process according to claim 1, wherein said catalyst is aluminum chloride.

4. Process according to claim 1, wherein said reaction is effected in an inert atmosphere.

References Cited

UNITED STATES PATENTS

| 3,356,731 | 12/1967 | Nilsson | 260—586 |
| 3,382,282 | 5/1968 | Grenoa | 260—586 |

OTHER REFERENCES

Oziomko et al.: "Chem. Abst.," vol. 65, col. 13573(e) (1966).

Nenitzescu: "Friedel-Crafts and Related Reactions," p. 1094 (1964).

BERNARD HELFIN, Primary Examiner

GERALD A. SCHWARTZ, Assistant Examiner